No. 725,180. PATENTED APR. 14, 1903.
W. H. UHLAND.
APPARATUS FOR MAKING STARCH.
APPLICATION FILED APR. 2, 1902.
NO MODEL.

Witnesses:
Max Meyer.
Max Rensch.

Inventor:
Wilhelm Heinrich Uhland
By F. W. Hoppen
Attorney ary application based on the rules.

UNITED STATES PATENT OFFICE.

WILHELM HEINRICH UHLAND, OF LEIPZIG-GOHLIS, GERMANY.

APPARATUS FOR MAKING STARCH.

SPECIFICATION forming part of Letters Patent No. 725,180, dated April 14, 1903.

Application filed April 2, 1902. Serial No. 101,119. (No model.)

*To all whom it may concern:*

Be it known that I, WILHELM HEINRICH UHLAND, a subject of the King of Saxony, residing at Leipzig-Gohlis, in the Kingdom of Saxony, German Empire, have invented a new and useful Apparatus for the Continuous Separation of Starch, Water, and Residual Substances, of which the following is a specification.

This invention relates to an apparatus for the continuous separation of starch, water, (extraction-water,) and residual substances according to the following two methods.

First. From an emulsion of raw starch a pure-starch emulsion is continuously extracted in a semifluid state at the bottom part of the apparatus, while the solid and dissolved impurities (fibers, albumens, salts) suspended in the extraction-water are continuously removed at the top part of the apparatus, then diluted with fresh water, and the separation is repeated several times until all the starch is extracted from the residuum and purified, this method being employed in the manufacture of starch from potatoes, maize, wheat, and similar materials containing starch.

Second. From the raw-starch emulsion a pure-starch emulsion is continuously extracted in a thin fluid state at the top part of the apparatus, while the impurities are continuously removed in a semifluid state at the bottom part of the apparatus, then diluted with fresh water, and the separation is repeated several times until all the starch is extracted from the impurities, this method being employed in the manufacture of starch from rice and similar materials containing starch.

Figure 1:
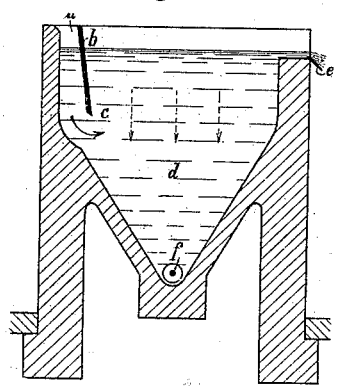
Figure 2:
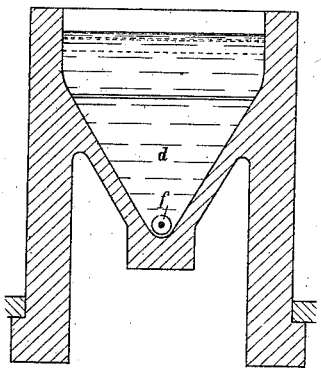
Figure 3:
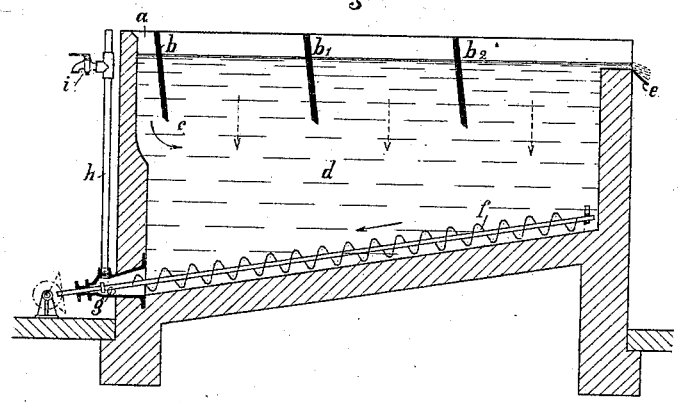
Figure 4:
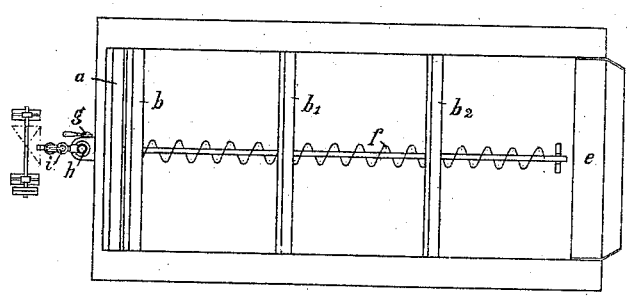

The apparatus employed in the methods described above is illustrated in Figures 1 to 4. Fig. 1 shows a square apparatus in a vertical longitudinal section. Fig. 2 is a vertical cross-section of a rectangular apparatus; Fig. 3, a vertical longitudinal section, and Fig. 4 a plan of the same.

The raw-starch emulsion is introduced into the apparatus by means of a channel $a$, which diverges downward and is formed by the slanting partition-wall $b$. In the said channel the emulsion descends while decreasing its velocity and is deflected at $c$ to the settling-space $d$. As the one channel-wall is rounded at the bottom, the solution will be gradually turned from the vertical to a horizontal direction, as is indicated by the arrow, so that every shock to the body of the liquid resting in the lower conical part of the apparatus is avoided.

During the slow flow of the liquid stream above the resting liquid body the starch particles will sink down in the lower conical part of the apparatus and gradually thicken the deeper they go downward. Since in an apparatus of square section it is difficult to give the bottom throughout a uniform inclination, it is best to form the bottom in two slanting planes inclined to each other in the middle. In the furrow so formed a transporting means—such as, for instance, an endless screw $f$—is mounted to turn, which during its slow rotation moves the concentrated starch mass to the outlet $g$, while preventing it from settling without stirring it up. The endless screw may be assisted in its action by placing it at an incline toward the outlet, as is shown in Fig. 3. The starch emulsion run off through the adjustable outlet $g$ may be further treated. If several apparatuses are combined for the purpose of continuously purifying the raw starch, a pump for transferring the starch from the one to the other apparatus may be omitted and the pressure of the liquid itself may be utilized for performing this duty, in which case the outlet $g$ is closed and the vertical pipe $h$, provided with the cock $i$, is made use of for letting off the starch emulsion.

The application of the regulating means $i$ is important, since a regulation of the concentration of the starch would not be possible if the starch emulsion were left to flow over freely.

In order to cause the starch particles ascending above the fluid stream to again descend and settle, a convenient number of partition-walls $b'$ $b^2$, according to the length of the apparatus, is arranged. The extraction-water freed of the starch is let off at the overflow $e$.

In the manufacture of starch from rice the impurities contained in the raw-starch emulsion settle much quicker than the starch itself, while in the manufacture of starch from potatoes, maize, or wheat the case is the reverse. This property of the rice-starch is utilized for the separation of the starch from the impurities, the starch emulsion being allowed to settle in suitable vessels until the impurities have sunk down and form a distinct sediment, while the starch still remains suspended in the water. The starch is then drawn off with the water cautiously, leaving the impurities behind. In order to extract the remaining starch from the sediment of impurities, the latter are diluted with water and the procedure is repeated over several times, usually three or four times. Evidently this process requires vessels capable of holding the entire quantity of diluted starch emulsion, and as the repeated extraction of starch from the residuum yields a large quantity of very diluted starch emulsion a very large number of settling-tanks is required. In the method of continuously separating the pure starch from the raw starch emulsion according to this my invention a uniformly-concentrated starch emulsion of small quantity is obtained, which requires less settling-tanks. Moreover, the continuous separation requires no big decanting vessels, but only small vessels for diluting the grinding product coming from the mill and for diluting the residuum run off from the apparatus. According to the method characterized in section 1 the emulsion of raw starch is introduced into the apparatus at $a$, deflected at $c$, and allowed to flow off at $e$. As in this case the impurities are heavier than the starch, they will collect in the bottom part of the apparatus, while the pure starch emulsion, freed of the impurities and suspended in the water, flows over at the top of the apparatus. For the extraction of the remaining starch from the resiuum run off at $g$ the latter is diluted and again subjected to a separation. To reduce the quantity of the starch emulsion flowing over, the starch emulsion flowing over the second apparatus is employed for diluting the grinding product of the mill, and the starch emulsion flowing over the third apparatus, which is very much diluted, is employed for diluting the residuum run off the first apparatus, while the starch emulsion flowing over the latter is conducted at once to the settling-tanks and always in the same degree of concentration.

Having now described the nature of my said invention, what I desire to secure by Letters Patent of the United States is—

In a square and rectangular tank for separating starch, the combination of a lateral entering-channel diverging downward, having a rounded shoulder for deflecting the starch emulsion to the horizontal direction, with transporting means on the bottom of the tank, a lower outlet and a vertical pipe with regulating means for letting off the starch emulsion.

In witness whereof I have hereunto set my hand in presence of two witnesses.

WILHELM HEINRICH UHLAND.

Witnesses:
RUDOLPH FRICKE,
B. H. WARNER, Jr.